US011683104B2

(12) United States Patent
Madan et al.

(10) Patent No.: US 11,683,104 B2
(45) Date of Patent: Jun. 20, 2023

(54) AUDIO BASED SERVICE SET IDENTIFIER

(71) Applicant: Google LLC, Mountain View, CA (US)

(72) Inventors: Arjita Madan, Hyderabad (IN); Sumit Kanhaiyalal Gwalani, Hyderabad (IN)

(73) Assignee: GOOGLE LLC, Mountain View, CA (US)

( * ) Notice: Subject to any disclaimer, the term of this patent is extended or adjusted under 35 U.S.C. 154(b) by 453 days.

(21) Appl. No.: 16/645,327

(22) PCT Filed: Jun. 15, 2018

(86) PCT No.: PCT/US2018/037749
§ 371 (c)(1),
(2) Date: Mar. 6, 2020

(87) PCT Pub. No.: WO2019/050590
PCT Pub. Date: Mar. 14, 2019

(65) Prior Publication Data
US 2021/0028867 A1    Jan. 28, 2021

Related U.S. Application Data

(60) Provisional application No. 62/555,851, filed on Sep. 8, 2017.

(51) Int. Cl.
*H04B 11/00* (2006.01)
*H04R 3/04* (2006.01)

(52) U.S. Cl.
CPC ............ *H04B 11/00* (2013.01); *H04R 3/04* (2013.01)

(58) Field of Classification Search
CPC .. H04R 3/04; H04B 11/00; G01S 5/18; H04N 76/02; H04W 8/005; H04W 72/0446;
(Continued)

(56) References Cited

U.S. PATENT DOCUMENTS 9,628,514 B2 *   4/2017   Kaufman ............... H04W 12/50
9,912,415 B2 *   3/2018   Tsfaty ........................ G01S 5/18
(Continued)

FOREIGN PATENT DOCUMENTS

CN    1172403 A      2/1998
CN    102971758 A    3/2013
CN    103119977 A    5/2013

OTHER PUBLICATIONS

International Search Report and Written Opinion for PCT/US2018/037749, dated Sep. 26, 2018, 2 pages.

*Primary Examiner* — Daniel L Murphy
*Assistant Examiner* — Amie M Ndure
(74) *Attorney, Agent, or Firm* — Dority & Manning, P.A.

(57) ABSTRACT

A first computing device is configured to broadcast a first audio token comprising a first identifier over a first audio frequency channel, activate a first microphone component, and receive a first audio response token generated by a second computing device via the first audio frequency channel. A second computing device is configured to receive an input indicating a request to receive data, activate the second microphone component, receive the first audio token over the first audio frequency channel, receive one or more other audio tokens over one or more other audio frequency channels, determine that the received first audio token comprises a valid audio token, restrict the range of received audio inputs to comprise only the first audio frequency channel, generate the first audio response token, and communicate the first audio response token to the first computing device via the first audio frequency channel.

20 Claims, 5 Drawing Sheets

(58) Field of Classification Search
CPC ........... H04W 72/0413; H04W 72/042; H04W 56/001; H04L 5/0055
See application file for complete search history.

(56) References Cited

U.S. PATENT DOCUMENTS

| | | | |
|---|---|---|---|
| 10,032,353 B2* | 7/2018 | Baczuk | H04W 4/70 |
| 10,278,054 B2* | 4/2019 | Choi | H04W 8/005 |
| 10,700,791 B2* | 6/2020 | Al-Mousa | H04B 11/00 |
| 10,914,827 B2* | 2/2021 | Davis | G01S 3/808 |
| 2003/0061002 A1* | 3/2003 | Steinbrecher | G01S 13/86 |
| | | | 702/159 |
| 2004/0202339 A1* | 10/2004 | O'Brien, Jr. | H04R 25/606 |
| | | | 379/430 |
| 2009/0070797 A1* | 3/2009 | Ramaswamy | H04N 21/4432 |
| | | | 725/10 |
| 2010/0030838 A1* | 2/2010 | Atsmon | A63H 3/28 |
| | | | 709/200 |
| 2011/0137144 A1* | 6/2011 | Rofougaran | H04L 12/6418 |
| | | | 600/595 |
| 2011/0144573 A1* | 6/2011 | Rofougaran | A61B 5/0022 |
| | | | 604/66 |
| 2011/0160802 A1* | 6/2011 | Rofougaran | G16H 10/65 |
| | | | 607/60 |
| 2012/0224456 A1* | 9/2012 | Visser | G01S 7/521 |
| | | | 367/118 |
| 2013/0026587 A1 | 1/2013 | Gambino et al. | |
| 2013/0197918 A1 | 8/2013 | Answell | |
| 2014/0108780 A1 | 4/2014 | Jin et al. | |
| 2015/0131539 A1* | 5/2015 | Tsfaty | H04B 11/00 |
| | | | 370/329 |
| 2016/0058296 A1* | 3/2016 | Da Silva | G01N 21/1702 |
| | | | 600/407 |
| 2016/0345113 A1* | 11/2016 | Lee | G01S 15/04 |
| 2017/0071017 A1* | 3/2017 | Klemans | H04W 4/80 |

\* cited by examiner

210

Registering, by a broadcasting system, for a broadcasting system account with an account management system and downloading an application on broadcasting computing device

310

Broadcasting computing device operator accesses account management system website via broadcasting computing device

320

Broadcasting computing device operator registers for a broadcasting system account via the account management system system website

330

Broadcasting computing device operator downloads an application on the broadcasting computing device

340

Broadcasting computing device operator uploads account information to broadcasting system account 220, Fig. 2

Figure 3

AUDIO BASED SERVICE SET IDENTIFIER

CROSS-REFERENCE TO RELATED APPLICATION

This patent application is based upon and claims the right of priority under 35 U.S.C. § 371 to International Application No. PCT/US2018/037749 filed on Jun. 15, 2018, which claims priority to U.S. Patent Application No. 62/555,851, filed Sep. 8, 2017, and entitled "Audio Based Service Set Identifier." The entire contents of the above-identified applications are hereby fully incorporated herein by reference.

TECHNICAL FIELD

The technology disclosed herein relates to discovery of broadcasting computing devices over a network, and particularly to establishing audio communication channels with broadcasting computing devices.

BACKGROUND

Broadcasting computing devices having speakers that emit data via audio communication channels are located at a variety of important locations including subway stops, bus stops, and other points of interest. Generally, at points of users may desire to perform an action via user computing devices. However, when multiple broadcasting computing devices are attempting to broadcast at a location simultaneously, an audio channel may get congested very quickly and the resulting interference may render all the communication attempts failed. In Wi-Fi communications, computing devices utilize service set identifiers ("SSIDs") to facilitate communication in environments where multiple computing devices may be communicating via Wi-Fi and prevent Wi-Fi communication channels from being congested. There is a need to enable broadcasting computing devices to communicate relevant information to user computing devices via audio communication channels when there are multiple broadcasting computing devices attempting to transfer data over audio communication channels simultaneously.

Current applications for discovery of computing devices over a network do not provide for discovery over audio communication channels between the computing devices.

SUMMARY

Techniques herein provide computer-implemented methods to establish audio communication channels with broadcasting computing devices.

In an example a computer-implemented method is proposed to establish an audio communication channel between a broadcasting computing device and a user computing device, comprising receiving, by a second computing device, an input indicating a request to receive data, wherein a first computing device broadcasts a first audio token comprising a first user computing device identifier over a first audio frequency channel; activating, by the second computing device, a second microphone component to receive audio inputs via two or more audio frequency channels comprising at least the first audio frequency channel; receiving, by the second computing device, the first audio token from the first computing device via the activated second microphone component over the first audio frequency channel; receiving, by the second computing device, one or more other audio tokens via the activated second microphone component over one or more other audio frequency channels not comprising the first audio frequency channel; determining, by the second computing device, that the received first audio token comprises a valid audio token; in response to determining that the received first audio token is a valid audio token, restricting, by the second computing device, the range of received audio inputs to comprise only the first audio frequency channel; generating, by the second computing device, the first audio response token; and communicating, by the second computing device, the first audio response token to first computing device via the first audio frequency channel, wherein the first computing device receives the first audio response token via the first audio frequency channel. An audio communication channel between the broadcasting computing device and the user computing device may thereby be established upon receiving the first audio response token and determining that it is valid.

Broadcasting the first audio token over the first audio frequency channel may for example comprise broadcasting the first audio token at a first frequency band and the one or more other audio tokens may be received at a frequency band different from the first frequency band. In an example, the second microphone component is activated to receive audio inputs over an overall frequency, e.g., 1-20 kHz, band and the first audio token is broadcast at a subchannel of the overall frequency band, e.g., 1-5 kHz or 5-10 kHz. Restricting the range of received audio inputs to comprise only the first audio frequency channel may thus in particular include stop listening over other frequency ranges.

In an example, two or more broadcasting computing devices broadcast audio tokens at a location and/or listen for audio tokens comprising audio service set identifiers ("SSIDs") at the location. In an example, a user computing device comprising an application receives audio tokens broadcast over audio communication channels at a location by broadcasting computing devices. The user computing device receives an audio token via an audio communication channel from each of two or more broadcasting computing devices at the location. Each broadcasting computing device broadcasts over a subchannel of an available frequency band and using one of multiple encoding schemes. The user computing device attempts to decode received audio tokens using multiple decoding schemes. If one of the schemes yields a valid audio token, the decoding scheme is treated as one of the available "audio SSIDs."

Similarly, other audio SSIDs are discovered by listening over a span of a few seconds after decoding the received valid audio token. When the user computing device receives multiple valid audio tokens, the user computing device selects a particular audio SSID. Once the user or the user computing device selects a particular available audio SSID, the user computing device responds by transmitting a response token to the broadcasting computing device from which the selected audio SSID originated using the same encoding scheme and frequency subchannel over which the user computing device received the selected audio SSID. In these examples, the user computing device and broadcasting computing device are tuned within the audio subchannel and encoding scheme. Any further data exchanged between the user computing device and the broadcasting computing device uses the encoding scheme and is tuned within the audio subchannel and will be ignored by other user computing devices or broadcasting computing devices searching for audio SSIDs. Upon receiving and decoding a response token, the broadcasting computing device and the user computing device have established an audio communication channel. For example, the user computing device transmits data to and receive data from the broadcasting computing device over the established audio communication channel and the broadcasting computing device transmits data to and receive data from the user computing device over the established audio communication channel.

In certain other example aspects described herein, systems and computer program products to establish audio communication channels with broadcasting computing devices are provided.

These and other aspects, objects, features, and advantages of the examples will become apparent to those having ordinary skill in the art upon consideration of the following detailed description of illustrated examples.

BRIEF DESCRIPTION OF THE DRAWINGS

FIG. 3 is a block flow diagram depicting a method for registering, by a broadcasting system, for a broadcasting system account with an account management system and downloading an application on a broadcasting computing device, in accordance with certain examples.

DETAILED DESCRIPTION OF EXAMPLE EMBODIMENTS

Overview

Figure 1:
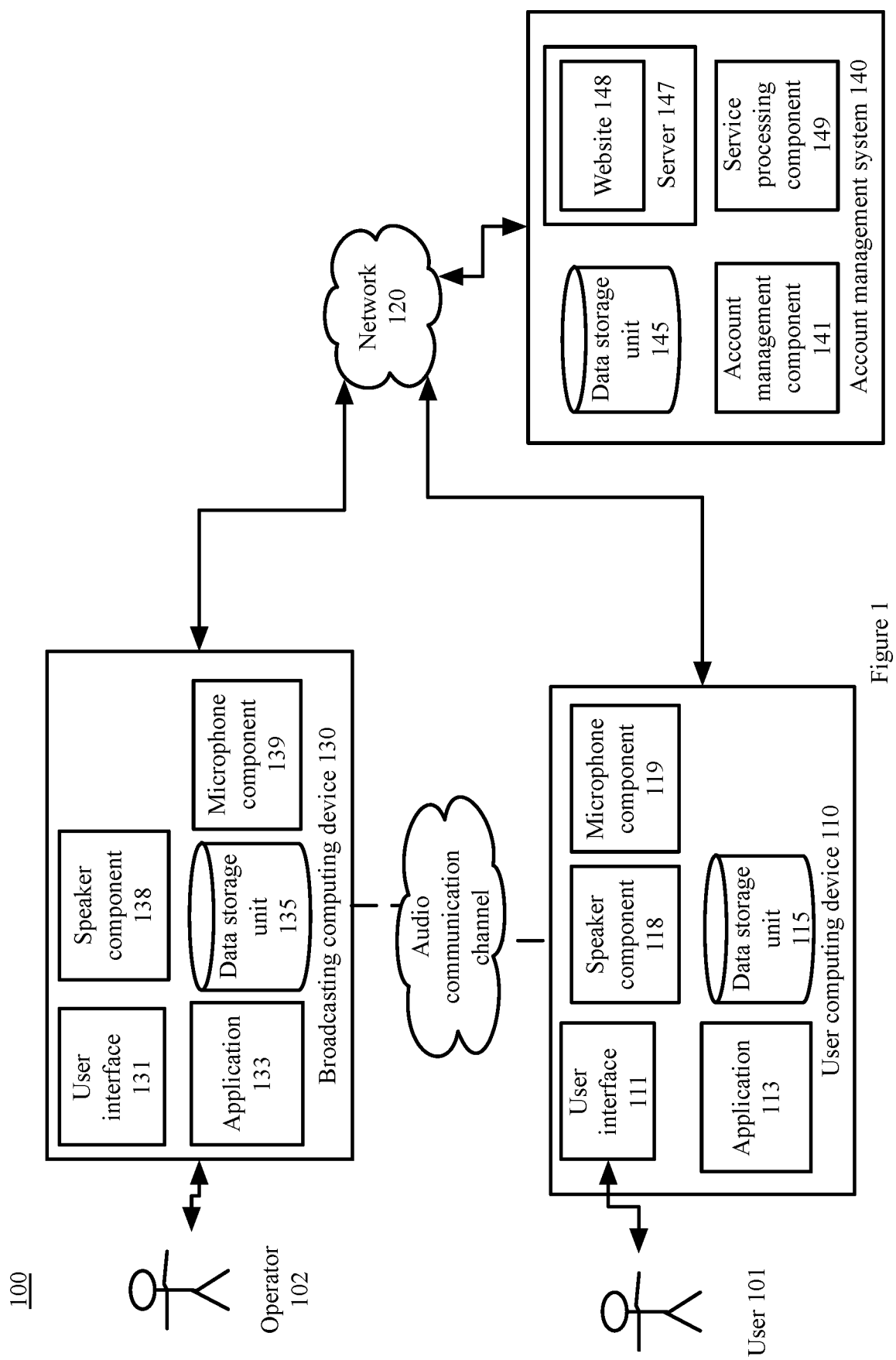
FIG. 1 is a block diagram depicting a system for establishing an audio communication channel between a broadcasting computing device and a user computing device in an environment in which multiple broadcasting computing devices are broadcasting audio tokens, in accordance with certain examples.

Examples herein provide computer-implemented techniques for establishing an audio communication channel with a broadcasting computing device in an environment in which multiple broadcasting computing devices are broadcasting audio tokens. The examples described herein further provide computer-implemented techniques for establishing an audio communication channel with a broadcasting computing device in an environment in which multiple broadcasting computing devices are broadcasting audio tokens.

In an example, an application on a user computing device that is used to transfer data over audio communication uses audio secure session identifiers ("audio SSIDs") to ensure multiple data transfer sessions can take place within close proximity with minimal interference. In the examples described herein, the term "SSID" is used due to the familiarity of SSIDs in the context of Wi-Fi communication—the actual data in these examples describing audio SSIDs may be formatted differently from SSIDs used in Wi-Fi communication. In other examples, the user computing device may use broadcasting computing device identifiers or other identifiers to ensure multiple data transfer sessions can take place within close proximity with minimal interference.

In an example, two or more broadcasting computing devices broadcast audio tokens at a location and/or listen for audio tokens comprising SSIDs at the location. In another example, two or more broadcasting computing devices broadcast audio tokens at a location and/or listen for audio tokens comprising broadcasting device identifiers at the location. In an example, a user computing device comprising an application receives audio tokens broadcast at a location by multiple broadcasting computing devices over audio communication channels. The user computing device receives an audio token via an audio communication channel from each of two or more broadcasting computing devices at the location. Each broadcasting computing device broadcasts over a subchannel of an available frequency band and using one of multiple encoding schemes. The user computing device attempts to decode received audio tokens using multiple decoding schemes. If one of the schemes yields a valid decoded audio token, the decoding scheme is designated as one of the available audio SSIDs. In another example, if one of the schemes yields a valid audio token, the decoding scheme is designated as one of the available broadcasting computing device identifiers.

In an example, after discovering an audio SSID, the user computing device discovers multiple other audio SSIDs by listening for a predetermined length of time, for example, over a span of a few seconds, after decoding the received valid audio token comprising the discovered audio SSID. When the user computing device receives multiple valid audio tokens, the user computing device selects a particular audio SSID. Once the user or the user computing device selects a particular available audio SSID, the user computing device responds by transmitting a response token to the broadcasting computing device from which the selected audio SSID originated using the same encoding scheme and frequency subchannel over which the user computing device received the selected audio SSID. In these examples, the user computing device and broadcasting computing device are tuned within the audio subchannel and encoding scheme. Any further data exchanged between the user computing device and the broadcasting computing device is particularly formatted and therefore will be ignored by other user computing devices or broadcasting computing devices searching for audio SSIDs. Upon receiving and decoding a response token, the broadcasting computing device and the user computing device have established an audio communication channel. For example, the user computing device transmits data to and receive data from the broadcasting computing device over the established audio communication channel. The broadcasting computing device transmits data to and receives data from the user computing device over the established audio communication channel.

In an example, multiple broadcasting computing devices broadcast audio tokens at a location and/or listen for audio tokens comprising audio SSIDs at the location. In an example, the audio token may be encoded or not encoded. An example audio SSID comprises a broadcasting computing device identifier associated with the broadcasting computing device broadcasting the audio SSID. For example, the broadcasting computing device identifier comprises a hardware identifier of the broadcasting computing device. In another example, the broadcasting computing device identifier comprises an identifier configured by an account management computing system. For example, an audio SSID comprises a word such as "apple" or a string of alphanumeric and/or symbolic characters such as "12h4G*d3M4&t2Fi678." In an example, user computing devices comprising an application receive audio tokens broadcast at a location by broadcasting computing devices over audio communication channels. In this example, each broadcasting computing device, including the user computing device, comprises a component capable of sound output and a component capable of a sound input. For example, each broadcasting computing device comprises a speaker component and a microphone component.

In an example, a user computing device receives an audio token via an audio communication channel from each of two or more broadcasting computing devices at a location. In an example, when a user computing device begins listening for audio tokens via a sound input component, it listens to audio over a wide frequency band. For example, when the user computing device begins listening for audio tokens, it listens over a frequency band of F1 to Fn, for example, 1-20 kHz. In an example, broadcasting computing devices broadcast over only a fraction of the available frequency band while broadcasting. For example, when a broadcasting computing device begins broadcasting it broadcasts over a subchannel of an available frequency band and using one of multiple encoding schemes. For example, the overall frequency band comprises a frequency band of F1 to Fn, for example, 1-20 kHz, and a subchannel of the overall frequency band comprises a frequency band of F1 to F2, for example, 1-5 kHz.

In an example, the user computing device attempts to decode received audio tokens using multiple decoding schemes. If one of the schemes yields a valid audio token, the decoding scheme is designated as one of the available "audio SSIDs." Similarly, other audio SSIDs are discovered by listening for a predetermined length of time, for example, over a span of a few seconds, after decoding the received valid audio token. In an example, the user computing device listens for an audio token of a specific format that comprises the audio SSID of a particular broadcasting computing device. The user computing device ignores all other audio signals not comprising the audio token in the environment in response to discovering the received valid audio token.

In an example, when the user computing device receives multiple valid audio tokens, the user computing device selects a particular audio SSID. For example, the application on the user computing device presents all available audio SSIDs to the user via a user interface of the user computing device for selection of a particular available audio SSID by the user. In an example, the user of the user computing device inputs a selection of a particular available audio SSID via the user interface by actuating an interface object on the user interface. In another example, the user computing device selects a particular available audio SSID from among multiple available audio SSIDs based on one or more criteria. In yet another example, the user computing device selects a particular available audio SSID from among multiple available audio SSIDs based on a correspondence of the selected particular available audio SSID with a particular audio SSID on a ranked list of preferred audio SSIDs stored on the user computing device or accessible to the user computing device via a network. In another example, the user computing device transmits received available audio SSIDs to an account management computing system over a network. The account management computing system selects a particular audio SSID from the transmitted audio SSIDs, and transmits the selected audio SSID to the user computing device via the network.

Once the particular available audio SSID is selected, the user computing device responds to the broadcasting computing device from which the selected audio SSID originated using the same encoding scheme and frequency subchannel over which the user computing device received the selected audio SSID. In these examples, the user computing device and broadcasting computing device are tuned within the audio subchannel and encoding scheme. Any further data exchanged between the user computing device and the broadcasting computing device is particularly formatted and therefore will be ignored by other user computing devices or broadcasting computing devices searching for audio SSIDs.

In an example, there are two broadcasting computing devices—a broadcasting computing device A and a broadcasting computing device B—and a user computing device also at a location. For example, the location comprises a merchant location, a public transportation location such as a subway or train station, a library, a restaurant, a vehicle, an outdoor venue, or any other location in which a broadcasting computing device that broadcasts data over audio communication channels may be located. An example broadcasting computing device comprises a radio, a television, a tablet device, a mobile phone device, or other device that includes a sound output component and is able to broadcast audio tokens via audio communication channels.

Continuing with this example, the broadcasting computing device A broadcasts Audio Token A at a frequency band of 5-10 kHz, broadcasting computing device B broadcasts Audio Token B at a frequency band of 10-15 kHz. The user computing device is able to listen for audio tokens over a frequency band of 1-20 kHz. The frequency bands described herein are example and other frequency bands may be utilized for transmission of audio tokens. In other examples, the broadcasting computing devices broadcast at various amplitude subchannel ranges within a wide amplitude band instead of or in addition to broadcasting at various frequency subchannel ranges within a wide frequency band.

Continuing with this example, Audio Token A comprises an SSID comprising the word "apple," converted into binary format and encoded using a standard audio encoding scheme, such as direct sequence spread spectrum ("DSSS") or binary phase shift keying ("BPSK"). In this example, Audio Token B comprises an SSID comprising the word "banana," converted into binary format and encoded using a standard audio encoding scheme, such as DSSS or BPSK. Broadcasting computing devices and the user computing device may utilize other formats and/or encoding schemes. In this example, the user computing device detects Audio Tokens A and B using a sound input component of the user computing device, for example, a microphone component. In this example, the user computing device decodes both Audio Token A and Audio Token B. For example, the user computing device successively utilizes a series of predetermined decoding schemes until the user computing device successfully decodes each of the received audio tokens. In another example, the user computing device successfully decodes Audio Token A but does not successfully decode Audio Token B. In yet another example, the user computing device successfully decodes Audio Token B but does not successfully decode Audio Token A. In an example, audio tokens include data corresponding to an SSID or broadcasting computing device identifier comprising one or more alphanumeric and/or symbolic characters. In another example, audio tokens comprise cryptographic or encoded data.

Continuing with this example, the user computing device determines that Audio Token A broadcast by broadcasting computing device A comprises an invalid signature and an Audio Token B broadcast by broadcasting computing device B comprises a valid signature. The user computing device generates a response token, Response Token B that is a function of Audio Token B. In case the response token is generated as a function of the received audio token the received audio token could be an input parameter to an algorithm for determining the response token. In a simple example the received audio token could be an input to an adder adding (bitwise) a value to the received audio token or increasing signal amplitudes of the received audio token in order to generate a response token. Based on the determination that Audio Token B is the only received audio token with a valid signature, the user computing device broadcasts Response Token B in the audio frequency band that corresponds to the frequency band over which the Audio Token B was broadcast by broadcasting computing device B. In this example, broadcasting computing device B receives Response Token B from the user computing device and decodes the response token. In this example, upon receiving and decoding Response Token B, broadcasting computing device B and the user computing device have established an audio communication channel. For example, the user computing device transmits data to and receive data from Broadcasting Computing Device B over the established audio communication channel. Broadcasting Computing Device B transmits data to and receives data from the user computing device over the established audio communication channel.

In another example, the user computing device transmits a request, via a network, to an account management computing system. The request comprises decoded data from Audio Token A and Audio Token B. The user computing device requests that the account management computing system select a particular audio token from among Audio Token A and Audio Token B. In this example, the account management computing system selects Audio Token B and transmits, via the network, a notice of the selection of Audio Token B to the user computing device. The user computing device receives the notice of the selection of Audio Token B via the network. Based on the received notice of the selection of Audio Token B, the user computing device broadcasts Response Token B, which is a function of Audio Token B, in the frequency band that corresponds to the frequency band over which Audio Token B was broadcast by broadcasting computing device B. In this example, broadcasting computing device B receives Response Token B from the user computing device and decodes the response token. In this example, upon receiving and decoding Response Token B, the broadcasting computing device B and the user computing device have established an audio communication channel. For example, the user computing device transmits data to and receives data from broadcasting computing device B over the established audio communication channel. In this example, broadcasting computing device B transmits data to and receives data from the user computing device over the established audio communication channel.

In yet another example, the user computing device, after receiving Audio Token A and Audio Token B, determines, based on data received in Audio Token A and/or Audio Token B, that Audio Token A did not originate from a trusted source and that Audio Token B originated from a trusted source. Based on this determination, the user computing device broadcasts Response Token B, which is a function of Audio Token B, in a frequency band that corresponds to the frequency band over which Audio Token B was broadcast by broadcasting computing device B. In this example, broadcasting computing device B receives Response Token B from the user computing device and decodes it. In this example, upon receiving and decoding Response Token B, broadcasting computing device B and the user computing device have established an audio communication channel. For example, the user computing device transmits data to and receive data from broadcasting computing device B over the established audio communication channel. In this example, broadcasting computing device B transmits data to and receives data from the user computing device over the established audio communication channel.

In yet another example, the user computing device receives and decodes Audio Token A and Audio Token B. In this example, Audio Token A comprises an SSID or a broadcasting device identifier comprising the word "apple" and Audio Token B comprises an SSID or broadcasting device identifier comprising the word "banana." In an example, the user computing device displays, via the user interface, a user interface object that reads "apple," a user interface object that reads "banana," and a request for the user to select a user interface object corresponding to a particular SSID or to a particular broadcasting device identifier. For example, the request reads "please select an SSID to establish an audio communication channel" or "please select a broadcasting device identifier to establish an audio communication channel." In this example, the user computing device displays data describing each selectable SSID or each selectable broadcasting device identifier including an indication as to whether the broadcasting computing device associated with the selectable SSID or selectable broadcasting device identifier is trustworthy. For example, the user computing device determines whether a broadcasting device is trustworthy based on a validity of a signature from a decoded audio token broadcast by the broadcasting computing device with which an audio communication channel would be established.

Continuing with this example, the user selects an interface object on the user interface of the user computing device that reads "banana" and that corresponds with Audio Token B and broadcasting computing device B. Based on the received input of the selection of the user interface object corresponding to audio token B and broadcasting computing device B, the user computing device broadcasts Response Token B, which is a function of Audio Token B, in a frequency band that corresponds to the frequency band over which Audio Token B was broadcast by broadcasting computing device B. broadcasting computing device B receives Response Token B from the user computing device and decodes the response token. In this example, upon receiving and decoding Response Token B, broadcasting computing device B and the user computing device have established an audio communication channel and each device transmits and/or receives data via the established audio communication channel. For example, the user computing device transmits data to and receives data from broadcasting computing device B over the established audio communication channel. In this example, broadcasting computing Device B transmits data to and receives data from the user computing device over the established audio communication channel.

In an example, after establishing an audio communication channel between a broadcasting computing device and a user computing device as described herein, the broadcasting computing device transmits data to the user computing device via the audio communication channel and the user computing device receives the transmitted data via the audio communication channel. In an example, the transmitted data comprises advertising data.

In an example, after establishing an audio communication channel between a broadcasting computing device and a user computing device as described herein, an account management computing system processes a transaction. In an example, the account management computing system receives transaction details from a broadcasting computing device and payment information associated with a user payment account from a user computing device. In another example, the account management computing system receives transaction details from a broadcasting computing device and extracts payment information associated with a user payment account. In an example, the account management computing system transmits a payment authorization request to an issuer system or other appropriate financial institution associated with the user payment account information via the network. An example payment authorization request comprises merchant system payment account information, user payment account information, and a total amount of the transaction. In an example, after the issuer system processes the payment authorization request, the account management system receives an approval or denial of the payment authorization request from the issuer system over the network. In an example, the account management system transmits a receipt to the broadcasting computing device and/or the user computing device comprising a summary of the payment transaction.

By using and relying on the methods and systems described herein, broadcasting computing devices, the user computing device, and the account management computing system enable a user computing device to establish an audio communication channel with a particular broadcasting computing device in an environment in which multiple broadcasting computing devices are broadcasting audio tokens at a location. As such, the methods and systems described herein enable a user computing device to selectively establish an audio communication channel with a broadcasting computing device.

Various examples will be explained in more detail in the following description, read in conjunction with the figures illustrating the program flow.

Example System Architecture

Turning now to the drawings, in which like numerals indicate like (but not necessarily identical) elements throughout the figures, examples are described in detail.

FIG. 1 is a block diagram depicting a system 100 for receiving an audio token by a user computing device 110 from a particular broadcasting computing device 130 in an environment in which multiple broadcasting computing devices 130 are broadcasting audio tokens, in accordance with certain examples. As depicted in FIG. 1, the system 100 comprises network computing devices 110, 130, and 140 that are configured to communicate with one another via one or more networks 120 and/or one or more audio communication channels. In some examples, a user associated with a device must install an application and/or make a feature selection to obtain the benefits of the techniques described herein.

In examples, the network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy ("BLE"), near field communication ("NFC"), ultrasound communication, or any combination thereof or any other appropriate architecture or system that facilitates the communication of signals, data, and/or messages. Throughout the discussion of examples, it should be understood that the terms "data" and "information" are used interchangeably herein to refer to text, images, audio, video, or any other form of information that can exist in a computer-based environment.

Each network computing device 110, 130, and 140 includes a device having a communication module capable of transmitting and receiving data over the network 120. For example, each network computing device 110, 130, and 140 can include a server, desktop computer, laptop computer, tablet computer, a television with one or more processors embedded therein and/or coupled thereto, smart phone, handheld computer, personal digital assistant ("PDA"), video game device, wearable computing device, or any other wired or wireless, processor-driven device. In the example depicted in FIG. 1, the network computing devices 110, 130, and 140 are operated by users 101, broadcasting computing device 130 operators 102, and account management system 140 operators, respectively.

In certain examples, two computing devices comprising a user computing device 110 and a broadcasting computing device 130 establish an audio communication channel. In other examples, a first user computing device 110 and a second user computing device 110 establish an audio communication channel. In other examples, one or more functions described herein as being performed by the user computing device 110 is performed by a first user computing device 110 and one or more functions described herein as being performed by the broadcasting computing device 130 may also be performed by a second user computing device 110. In other examples, one or more functions described herein as being performed by a first computing device 110 is performed by a second computing device 110 and one or more functions herein described as being performed by the second computing device 110 may also be performed by the first computing device 110. In other examples, one or more functions described herein as being performed by the user computing device 110 is performed by the broadcasting computing device 130 and one or more functions described herein as being performed by the broadcasting computing device 130 is performed by the user computing device 110.

An example user computing device 110, or first user computing device, comprises a user interface 111, an application 113, a data storage unit 115, an speaker component 118, and a microphone component 119. In an example, the user computing device 110 communicates with an account management system 140 via the network 120 and with the broadcasting computing device 130 via an audio communication channel.

An example user interface 111 enables the user 101 to interact with the user computing device 110. For example, the user interface 111 comprises a touch screen, a voice-based interface, or any other interface that allows the user 101 to provide input and receive output from an application on the user computing device 110. In an example, the user 101 interacts via the user interface 111 with the application 113.

An example application 113 comprises a program, function, routine, applet, or similar entity that exists on and performs its operations on the user computing device 110. In certain examples, the user 101 must install the application 113 and/or make a feature selection on the user computing device 110 to obtain the benefits of the techniques described herein. In an example, the user 101 accesses the application 113 on the user computing device 110 via the user interface 111. In an example, the application 113 is associated with the account management system 140. In an example, the application 113 comprises a merchant application, an Internet browser, a digital wallet application, a loyalty card application, another value-added application, a user interface 121 application, or other suitable application operating on the user computing device 110. In an example, the application 113 receives multiple audio tokens including an audio token broadcast by a broadcasting computing device 130. In an example, the application 113 selects the audio token received from the broadcasting computing device 130 and restricts audio inputs to correspond to a frequency channel over which the audio token was received. In an example, the application 113 generates a response token based on the received audio token and transmits a response token to the broadcasting computing device 130. The application 113 establishes a communication channel between the user computing device 110 and the broadcasting computing device 130 and sends and/or receives data via the audio communication channel.

An example data storage unit 115 comprises a local or remote data storage structure accessible to the user computing device 110 suitable for storing information. In an example, the data storage unit 115 stores encrypted information, such as HTML5 local storage. In an example, the data storage unit 115 and application 113 may be implemented in a secure element or other secure memory (not shown) on the user computing device 110. In another example, the data storage unit 115 may be a separate memory unit resident on the user computing device 110.

A speaker component 118 comprises a speaker device or other device capable of producing a sound output. In an example, a sound output comprises an audible sound output. In another example, a sound output comprises an ultrasound output. In an example, the speaker component 118 can communicate with the application 113 to receive an instruction to broadcast a sound output. In an example, the speaker component 118 is a component of the user computing device 110. In another example, the speaker component 118 is communicatively coupled to the user computing device 110 via the network 120.

An example microphone component 119 comprises a microphone device that is capable of receiving sound inputs from an environment of the user computing device 110. In an example, sound inputs comprise audible sound inputs. In another example, sound inputs comprise ultrasound inputs. In an example, the microphone component 119 communicates with the application 113 to receive an instruction to transition from a passive mode to an active mode and listen for sound inputs. In an example, the microphone component 119 receives sound inputs while in the active mode and transmits the received sound inputs to the application 113.

An example broadcasting computing device 130, or second user computing device, comprises a user interface 131, an application 133, a data storage unit 135, a speaker component 138, and a microphone component 139. In an example, the broadcasting computing device 130 comprises a computing device such as a smartphone device, a television, a radio, a tablet device, a mobile computing device, or other computing device. In another example, the broadcasting computing device 130 comprises a point of sale terminal. The broadcasting computing device 130 communicates with an account management system 140 via the network 120 and with the user computing device 110 via audio communication channels. In an example, the broadcasting computing device 130 communicates with an issuer system via the network 120.

An example user interface 131 enables a broadcasting computing device 130 operator to interact with the broadcasting computing device 130. For example, the user interface 131 comprises a touch screen, a voice-based interface, or any other interface that allows the broadcasting computing device 130 operator to provide input and receive output from an application 133 on the broadcasting computing device 130. In an example, the broadcasting computing device 130 operator interacts via the user interface 131 with the application 133.

An example application 133 is a program, function, routine, applet, or similar entity that exists on and performs its operations on the broadcasting computing device 130. An example application 133 comprises an Internet browser, a digital wallet application, a loyalty card application, another value-added application, a user interface 121 application, or other suitable application operating on the user computing device 110 that communicates with the account management system 140 via the network. In certain examples, the broadcasting computing device 130 operator must install the application 133 and/or make a feature selection on the broadcasting computing device 130 to obtain the benefits of the techniques described herein. In an example, the broadcasting computing device 130 operator accesses the application 133 on the broadcasting computing device 130 via the user interface 131. In an example, the application 133 is associated with the account management system 140.

An example data storage unit 135 comprises a local or remote data storage structure accessible to the broadcasting computing device 130 suitable for storing information. In an example, the data storage unit 135 stores encrypted information, such as HTML5 local storage. In an example, the data storage unit 135 and application 133 may be implemented in a secure element or other secure memory (not shown) on the broadcasting computing device 130. In another example, the data storage unit 135 may be a separate memory unit resident on the broadcasting computing device 130.

An example speaker component 138 comprises a speaker device or other device capable of producing an audible sound output and/or an ultrasound output. In an example, the speaker component 138 can communicate with the application 133 to receive an instruction to broadcast an ultrasound output. In an example, the speaker component 138 can communicate with the application 133 to receive an instruction to broadcast an audible sound output. In an example, the speaker component 138 is a component of the broadcasting computing device 130. In another example, the speaker component 138 is communicatively coupled to the broadcasting computing device 130.

An example microphone component 139 comprises a microphone device that is capable of receiving ultrasound inputs and/or audible sound inputs from an environment of the broadcasting computing device 130. In an example, the microphone component 139 communicates with the application 133 to receive an instruction to transition from a passive mode to an active mode and listen for ultrasound inputs and/or audible sound inputs. In an example, the microphone component 139 receives ultrasound inputs and/or audible sound inputs while in the active mode and transmits the received ultrasound inputs and/or audible sound inputs to the application 133.

An example account management system 140, or service processing system, comprises an account management component 141, a data storage unit 145, a server 147, a website 148, and a service processing component 149. In an example, the account management system 140 communicates with one or more user computing devices 110 and with one or more broadcasting computing devices 130 via the network 120. In an example, the account management system 140 communicates with one or more issuer systems via the network 120. In an example, the account management system 140 comprises a account management system.

In an example, the account management component 141 manages user 101 accounts and merchant system accounts associated with users 101 and merchant systems. The account management component 141 receives requests to add, edit, delete, or otherwise modify payment account information for a user 101 account or a merchant system account and adds, edits, deletes, or otherwise modifies payment account information for the user 101 account or the merchant system account in accordance with the received instructions.

An example data storage unit 145 comprises a local or remote data storage structure accessible to the account management system 145 suitable for storing information. In an example, the data storage unit 145 stores encrypted information, such as HTML5 local storage.

An example server 147 provides the content accessible by the user 101 through a web browser of the user computing device 110 or by the operator 102 through a web browser of the broadcasting computing device 130, including but not limited to html documents, images, style sheets, and scripts. In another example, the server 147 provides the content accessible by the user 101 through an application 113 of the user computing device 110 or by the operator 102 through an application 133 of the broadcasting computing device 130, including but not limited to html documents, images, style sheets, and scripts. In an example, the server 147 supports the account management system website 148.

An example website 148 is a means by which the user 101 registers for a user account with the account management system 140 and downloads an application 113 on the user computing device 110. In an example, the website 148 is a means by which the operator 102 registers for a broadcasting system account with the account management system 140 and downloads an application 133 on the broadcasting computing device 130. In an example embodiment, the user 101 accesses the website 148 via the application 113 or via a web browser of the user computing device 110. In another example, the operator 102 of the broadcasting computing device 130 accesses the website 148 via the application 133 or via a web browser of the broadcasting computing device 130.

An example service processing component 149 receives transaction details from a broadcasting computing device 130 and payment information associated with a user 101 payment account from a user computing device 110. In another example, the service processing component 149 receives a transaction identifier generated by the broadcasting computing device 130, a merchant computing device 130 identifier, and transaction details from the broadcasting computing device 130. For example, the transaction details comprise the total amount of the transaction. In an example, the transaction processing component identifies a merchant system account based on the broadcasting computing device 130 identifier and identifies a merchant system payment account associated with the merchant system account for use in the transaction. In an example, the service processing component 149 associates the received transaction details, transaction identifier and merchant system payment account information and stores the associated transaction details, transaction identifier, and merchant system payment account information in a data storage unit 145 or other memory accessible by the account management system 140. In this example, the service processing component 149 extracts the stored transaction details and merchant system payment account information associated with the transaction identifier. In an example, the service processing component 149 receives a user 101 payment account identifier based on a selection of the user 101 of the particular payment account via the user interface 111 of the user computing device 110. In this example, the service processing component 149 extracts the user 101 payment account information associated with the payment account identifier. In another example, the account management system 140 receives data from the user computing device 110 via the network 120 and transmits the data via the network 120 to the broadcasting computing device 130. In yet another example, the account management system 140 receives data from the broadcasting computing device 130 via the network 120 and transmits the data via the network 120 to the user computing device 110.

In another example, the service processing component 149 receives transaction details from a broadcasting computing device 130 and extracts payment information associated with a user 101 payment account. In an example, the service processing component 149 transmits a payment authorization request to an issuer system or other appropriate financial institution associated with the user 101 payment account information. An example payment authorization request comprises merchant system payment account information, user 101 payment account information, and a total amount of the transaction. In an example, after the issuer system processes the payment authorization request, the service processing component 149 receives an approval or denial of the payment authorization request from the issuer system over the network 120. In an example, the service processing component 149 transmits a receipt to the broadcasting computing device 130 and/or the user computing device 110 comprising a summary of the payment transaction.

In another example, the account management system 140 facilitates a transfer of data between the broadcasting computing device 130 and the user computing device 110. For example, the service processing component 149 receives data from a broadcasting computing device 130 and a data transfer identifier generated by the broadcasting computing device 130 via the network 120. In this example, the account management system subsequently receives the data identifier from a user computing device 110 via the network 120. In an example, in response to receiving the data transfer identifier from the user computing device 110, the account management system 140 transmits the data associated with the data transfer identifier to the user computing device 110 via the network 120 and the user computing device 110 receives the data via the network 120.

An example issuer system approves or denies a payment authorization request received from the broadcasting computing device 130 or from the account management system 140. In an example, the issuer system communicates with the broadcasting computing device 130 and/or account management system 140 over the network 120. In an example, the issuer system communicates with an acquirer system to approve a credit authorization and to make payment to the account management system 140 and/or merchant system. For example, the acquirer system is a third party account management company.

It will be appreciated that the network connections shown are example and other means of establishing a communications link between the computers and devices can be used. Additionally, those having ordinary skill in the art and having the benefit of the present disclosure will appreciate that the computing devices illustrated in FIG. 1 can have any of several other suitable computer system configurations.

For example a user computing device 120 embodied as a mobile phone or handheld computer may not include all the components described above.

Figure 5:
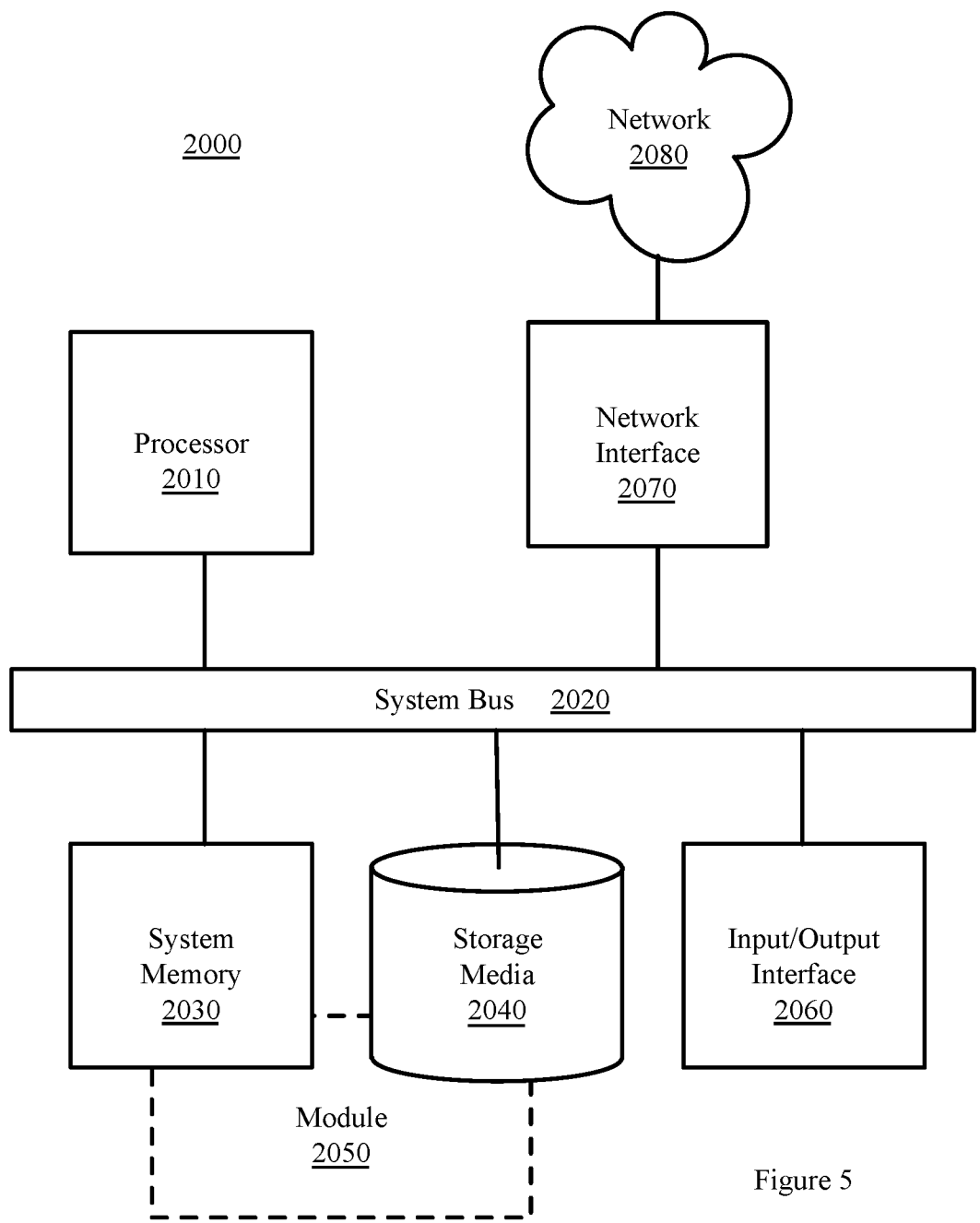
FIG. 5 is a block diagram depicting a computing machine and module, in accordance with certain examples.

In examples, the network computing devices and any other computing machines associated with the technology presented herein may be any type of computing machine such as, but not limited to, those discussed in more detail with respect to FIG. 5. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 1. The computing machines discussed herein may communicate with one another, as well as with other computing machines or communication systems over one or more networks, such as network 120. The network 120 may include any type of data or communications network, including any of the network technology discussed with respect to FIG. 5.

Further Examples

In an example, multiple broadcasting devices attempt to broadcast audio tokens at the same time. A user computing device receives audio tokens from each of the multiple broadcasting devices and must choose the correct device with which to communicate. Each of the broadcasting devices can communicate over an entire range of sound (F1 to FN) and any listening device, including the user computing device, listens to the whole range of sound F1 to FN. For example, three devices are broadcasting at ranges A, B, C within the frequency band F1 to FN. The user computing device receives an audio token from all three broadcasting devices and audio SSIDs, or audio channel identifiers, are included in each broadcasted sound token. The listening user computing device selects one of the received signals and then only listens to communications in that range and stops listening over other frequency ranges. For example, if the user computing device selects the audio token that was transmitted over frequency range C, the user computing device stops listening over frequency ranges A and B and only transmits and listens for audio communications over frequency range C. In an example, the user computing device transmits a response audio token over frequency range C and the broadcasting computing device that transmitted the audio token over frequency range C receives the response token. The user computing device and the broadcasting computing device that transmitted the audio token over frequency range C communicate over an audio communication channel over frequency range C. In certain examples, the user computing device and the broadcasting computing device that transmitted the audio token over frequency range C exchange cryptographic keys or other data to establish a secure audio communication channel over frequency range C.

Example System Process

The components of the example operating environment 100 are described hereinafter with reference to the example methods illustrated in FIGS. 2-4. The example methods of FIGS. 2-4 may also be performed with other systems and in other environments. The operations described with respect to any of the FIGS. 2-4 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
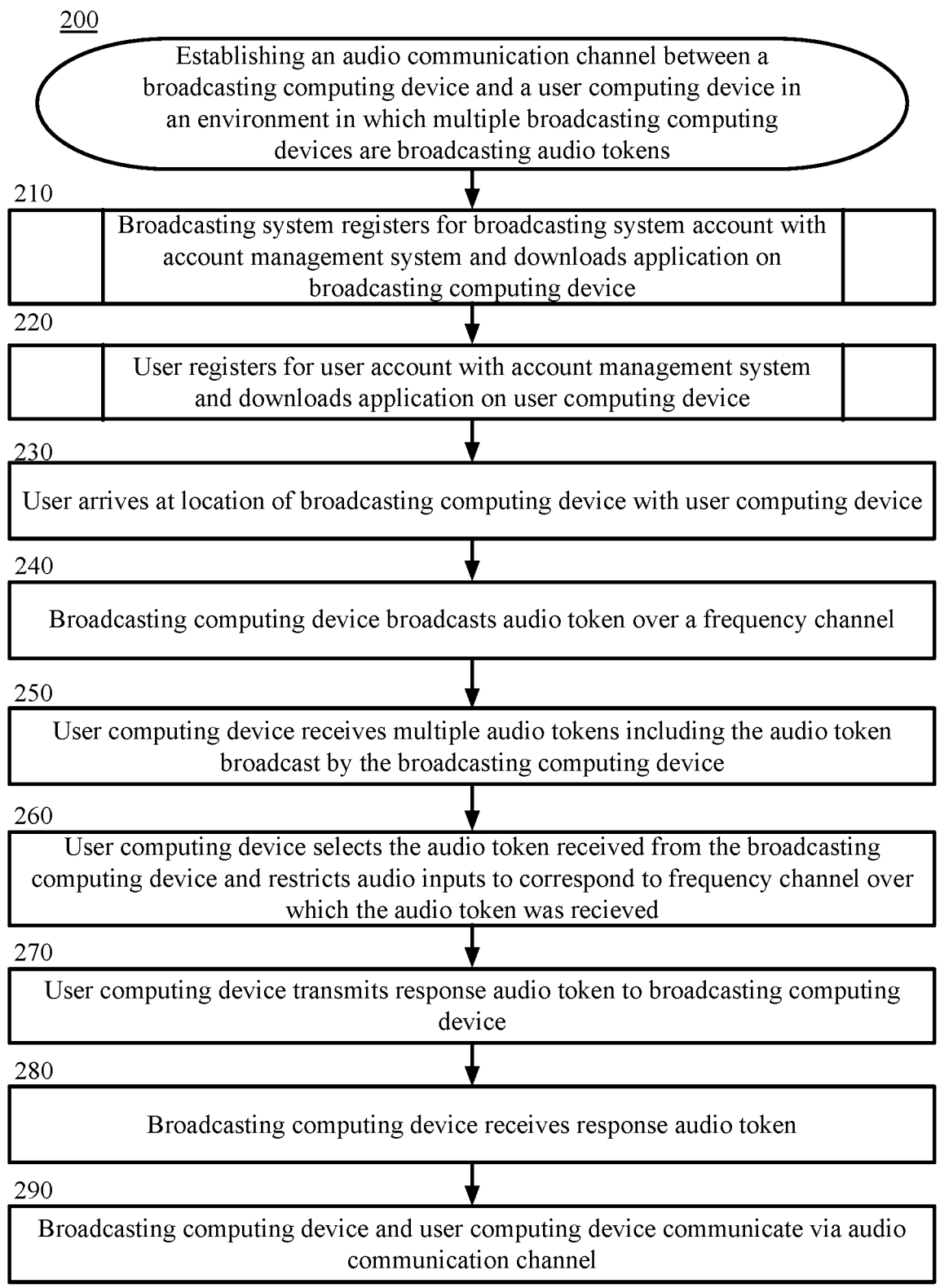
FIG. 2 is a block flow diagram depicting a method for establishing an audio communication channel between a broadcasting computing device and a user computing device in an environment in which multiple broadcasting computing devices are broadcasting audio tokens, in accordance with certain examples.

FIG. 2 is a block flow diagram depicting a method to establish an audio communication channel between a broadcasting computing device 130 and a user computing device 110, in accordance with certain examples. The method 200 is described with reference to the components illustrated in FIG. 1.

In block 210, the broadcasting system registers for a broadcasting system account with the account management system 140 and downloads the application 133 on the broadcasting computing device 130. The method to register, by a broadcasting system, for a broadcasting system account with an account management system 140 and to download an application 133 on a broadcasting computing device 130 is described in more detail hereinafter with reference to the methods described in FIG. 3.

FIG. 3 is a block flow diagram depicting a method 210 to register, by a broadcasting system, for a broadcasting system account with an account management system 140 and to download an application 133 on a broadcasting computing device 130, in accordance with certain examples, as referenced in block 210. The method 210 is described with reference to the components illustrated in FIG. 1.

In block 310, the broadcasting computing device 130 operator 102 accesses the account management system 140 website 148 via the broadcasting computing device 130. In an example, the operator 102 accesses the account management system website 148 via a web browser of the broadcasting computing device 130. For example, the operator 102 enters the website 148 address in the address bar of the web browser to access the website 148 via the network 120. In another example, the operator 102 accesses the account management system website 148 website using an application resident on the broadcasting computing device 130. For example, the operator 102 selects an application on the broadcasting computing device 130 that connects the user 101 to the payment processing system 120 website.

In block 320, the broadcasting computing device 130 operator 102 registers for a broadcasting system account via the account management system 140 website 148. For example, the operator 102 establishes a broadcasting system account with the account management system 140. In an example, the operator 102 registers a username and a password associated with the broadcasting system account to use to sign in to the broadcasting system account. In an example, the broadcasting system account is associated with a service, such as a digital wallet, an email service, a messaging service, a gaming service, or a mapping service. In another example, the broadcasting system account is associated with multiple services.

In block 330, the broadcasting computing device 130 operator 102 downloads an application 133 on the broadcasting computing device 130. In an example, the application 133 communicates with the account management system 140 over the network 120. In an example, the application 133 is associated with the broadcasting system account and may be utilized by the operator 102 or broadcasting system to access the broadcasting system account and/or services provided by the account management system 140 for the broadcasting system or for the operator 102 associated with the broadcasting computing device 130. For example, the application 133 may be a digital wallet application to which the broadcasting system may upload financial data. In this example, the application 133 communicates with the account management system 140, which administers the digital wallet account. In another example, the operator 102 may download various applications associated with the broadcasting system account from the account management system 140. In another example, the application 133 is downloaded onto the broadcasting computing device 130 before the operator 102 establishes the broadcasting system account with the account management system 140. In certain examples, the operator 102 does not download the application 113 onto the broadcasting computing device 130.

In block 340, the broadcasting computing device 130 operator 102 uploads account information to the broadcasting system account. Example account information comprises financial account information. For example, the operator 102 enters financial account information into the broadcasting system account. In an example, the financial account information is associated with a financial institution system. In an example, the financial institution system is a bank or a credit union with which the operator 102 or broadcasting system has a financial account. In an example, financial account information comprises an account number, a routing number, the name associated with the financial account, the address associated with the financial account and/or any other relevant, useful, or necessary information that the operator 102 may enter into the broadcasting system account or that the broadcasting system account may require. In an example, the operator 102 enters the financial account information using the application 133. For example, the application 133 is a digital wallet application module that communicates via the network 120 with a digital wallet account managed by the account management system 140. In another example, the user 101 enters the financial account information via a web browser, which communicates with the account management system website 148 via the network 120.

In certain examples, the operator 102 enters credit account information into the broadcasting system account. In an example, the credit account is associated with an issuer system and an acquirer system. In an example, the credit account information comprises a credit card number, an expiration date, a card verification number, the name associated with the credit account, and/or any other relevant, useful, or necessary information that the operator 102 may enter into the broadcasting system account or that the broadcasting system account may require. In an example, the operator 102 enters the credit account information using the application 133, which communicates with the account management system 140 via the network 120. In another example, the operator 102 enters the financial account information via a web browser, which communicates with the account management system website 148 via the network 120.

The method 210 then proceeds to block 220 in FIG. 2.

Returning to FIG. 2, in block 220, the user 101 registers for a user account with the account management system 140 and downloads an application 113 on the user computing device 110. The method to register, by a user, for a user account with an account management system 140 is described in more detail hereinafter with reference to the methods described in FIG. 4.

Figure 4:
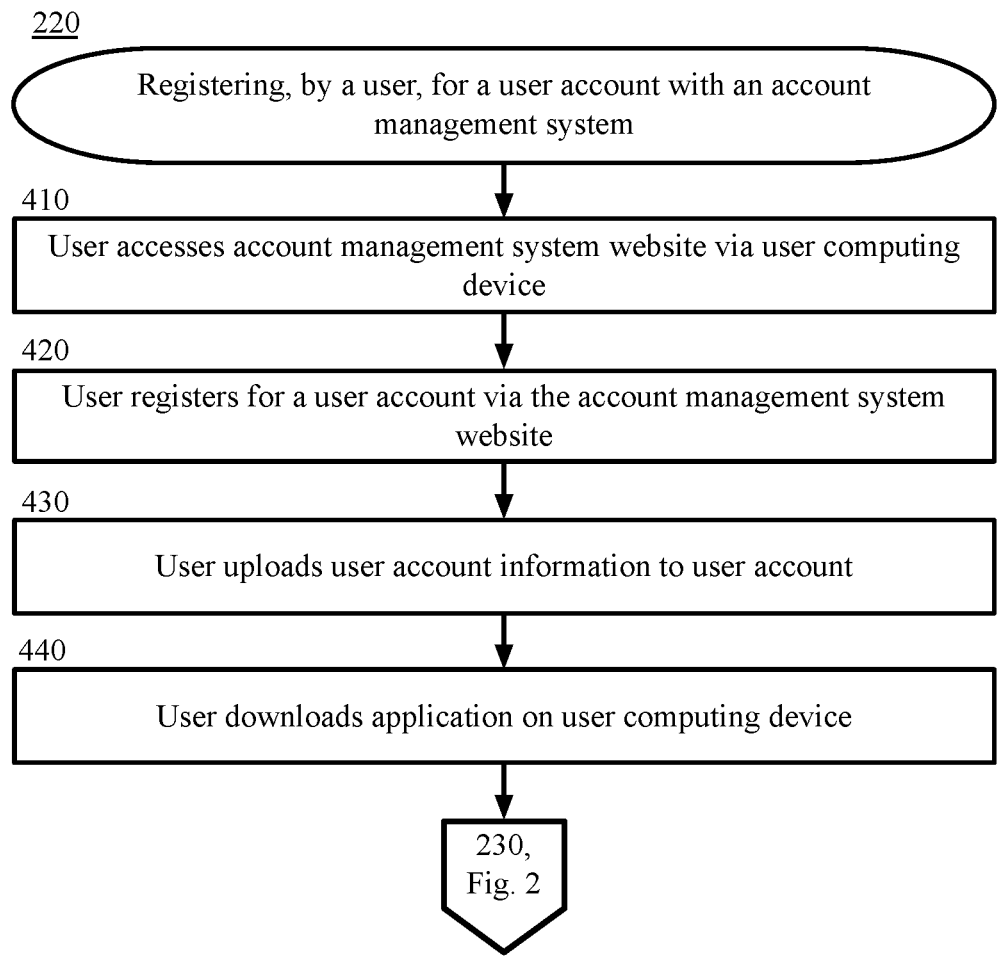
FIG. 4 is a block flow diagram depicting a method for registering, by a user, for a user account with an account management system, in accordance with certain examples.

FIG. 4 is a block flow diagram depicting a method 220 to register, by a user, for a user account with an account management system 140, in accordance with certain examples, as referenced in block 220. The method 220 is described with reference to the components illustrated in FIG. 1.

In block 410, the user 101 accesses the account management system 140 website 148 via the user computing device 110. In an example, the user 101 accesses the account management system 140 website 148 via a web browser of the user computing device 110. For example, the user 101 enters the website address in the address bar of the web browser to access the website 148. In another example, the user 101 accesses the account management system website 148 using an application 113 resident on the user computing device 110. For example, the user 101 selects an application 113 on the user computing device 110 that connects the user 101 to the account management system website 148 via the network 120.

In block 420, the user 101 registers for a user account via the account management system 140 website 148. In an example, the user 101 registers a username and a password associated with the user account to use to sign in to the user account. In an example, the user account is associated with a service, such as a digital wallet, an email service, a messaging service, a gaming service, or a mapping service. In another example, the user account is associated with multiple services.

In block 430, the user 101 uploads the user account information to the user account. Example user account information comprises user financial account information. For example, the user 101 enters financial account information into the user account. In an example, the financial account information is associated with a financial institution system. In an example, the financial institution system is a bank or a credit union with which the user 101 has a financial account. In an example, financial account information comprises an account number, a routing number, the name associated with the financial account, the address associated with the financial account and/or any other relevant, useful, or necessary information that the user 101 may enter into the user account or that the user account may require. In an example, the user 101 enters the financial account information using the application 113. For example, the application 113 is a digital wallet application that communicates with a digital wallet account managed by the account management system 140. In another example, the user 101 enters the financial account information via a web browser, which communicates with the account management system 140 website 148 via the network 120.

In certain examples, the user 101 enters credit account information into the user 101 account. In an example, the credit account is associated with an issuer system 130 and an acquirer system 140. In an example, the credit account information comprises a credit card number, an expiration date, a card verification number, the name associated with the credit account, and/or any other relevant, useful, or necessary information that the user 101 may enter into the user account or that the user account may require. In an example, the user 101 enters the credit account information using the application 113, which communicates with the account management system 140 via the network 120. In another example, the user 101 enters the financial account information via a web browser, which communicates with the account management system website 148 via the network 120.

In block 440, the user 101 downloads an application 113 on the user computing device. In an example, the application 113 communicates with the account management system 140 over the network 120. In an example, the application 113 is associated with the user account and may be utilized by the user 101 to access the user account and/or services provided by the account management system 140 for the user 101 associated with the user account. For example, the application 113 may be a digital wallet application module to which the user 101 may upload financial data. In this example, the application 113 communicates with the account management system 140, which administers the user digital wallet account. In another example, the user 101 may download various applications 113 associated with the user account from the account management system 140. In another example, the application 113 is downloaded onto the user computing device 110 before the user 101 establishes the user account with the account management system 140. In certain examples, the user 101 does not download the application 113 onto the user computing device 110.

From block 440, the method 220 proceeds to block 230 in FIG. 2.

Returning to FIG. 2, in block 230, the user 101 arrives at the location of the broadcasting computing device 130 with the user computing device 110. For example, the location comprises a merchant location, a public transportation location such as a subway or train station, a library, a restaurant, a vehicle, an outdoor venue, or any other location in which a broadcasting computing device 130 that broadcasts data over audio communication channels may be located.

In block 240, the broadcasting computing device 130 broadcasts an audio token over a frequency channel. In an example, multiple broadcasting computing devices 130 broadcast audio tokens at a location and/or listen for audio tokens comprising audio secure session identifiers ("SSIDs") at the location. In an example, the audio token may be encoded or not encoded. An example audio SSID comprises a broadcasting computing device 130 identifier associated with the broadcasting computing device 130 broadcasting the audio SSID. For example, the broadcasting computing device 130 identifier comprises a hardware identifier of the broadcasting computing device 130. In another example, the broadcasting computing device 130 identifier comprises an identifier configured by an account management computing system 140. For example, an audio SSID comprises a word or series of characters such as "apple" or a string of alphanumeric and/or symbolic characters such as "12h4G*d3M4&t2Fi678." In an example, user computing devices 110 comprising applications 113, including the user computing device 110 comprising the application 113, receive audio tokens broadcast at a location by broadcasting computing devices 130 over audio communication channels. In this example, each broadcasting computing device 130 comprises a component capable of sound output and a component capable of a sound input. For example, each broadcasting computing device 130 comprises a speaker component and a microphone component. In this example, each user computing device 110 comprises a component capable of sound output and a component capable of a sound input. For example, each user computing device 110 comprises a speaker component and a microphone component.

In an example, there are two broadcasting computing devices—broadcasting computing device 130 A and broadcasting computing device 130 B—and a user computing device 110 also at a location. In this example, the broadcasting computing device A broadcasts Audio Token A at a frequency band of 5-10 kHz, broadcasting computing device B broadcasts Audio Token B at a frequency band of 10-15 kHz. An example broadcasting computing device 130 comprises a radio, a television, a tablet device, a mobile phone device, or other device that includes a sound output component and is able to broadcast audio tokens via audio communication channels.

In block 250, the user computing device 110 receives multiple audio tokens, including the audio token broadcast by the broadcasting computing device 130. In an example, a user computing device 110 receives an audio token via an audio communication channel from each of two or more broadcasting computing devices 130 at a location. In an example, when a user computing device 110 begins listening for audio tokens via a sound input component, it listens to audio over a wide frequency band. For example, when the user computing device 110 begins listening for audio tokens, it listens over a frequency band of F1 to Fn, for example, 1-20 kHz. In an example, broadcasting computing devices broadcast 130 over only a fraction of the available frequency band while broadcasting. For example, when a broadcasting computing device 130 begins broadcasting it broadcasts over a subchannel of an available frequency band and using one of multiple encoding schemes. For example, the overall frequency band comprises a frequency band of F1 to Fn, for example, 1-20 kHz, and a subchannel of the overall frequency band comprises a frequency band of F1 to F2, for example, 1-5 kHz.

In an example, the user computing device 110 attempts to decode received audio tokens using multiple decoding schemes. If one of the schemes yields a valid audio token, the decoding scheme is designated as one of the "available audio SSIDs." Similarly, other audio SSIDs are discovered by listening for a predetermined length of time, for example, over a span of a few seconds, after decoding the received valid audio token. In an example, the user computing device 110 listens for an audio token of a specific format that comprises the audio SSID of a particular broadcasting computing device 130. The user computing device 110 ignores all other audio signals not comprising the audio token in the environment in response to discovering the received valid audio token.

In an example, the user computing device is able to listen for audio tokens over a frequency band of 1-20 kHz. In this example, broadcasting computing device A broadcasts Audio Token A at a frequency band of 5-10 kHz and broadcasting computing device B broadcasts Audio Token B at a frequency band of 10-15 kHz. In this example, Audio Token A comprises the word "apple," converted into binary format and encoded using a standard audio encoding scheme, such as direct sequence spread spectrum ("DSSS") or binary phase shift keying ("BPSK"). In this example, Audio Token B comprises the word "banana," converted into binary format and encoded using a standard audio encoding scheme, such as DSSS or BPSK. In this example, other formats and/or encoding schemes may be utilized. In this example, the user computing device 110 detects Audio Tokens A and B using a sound input component of the user computing device 110, for example, a microphone component. In this example, the user computing device 110 decodes both Audio Token A and Audio Token B. For example, the user computing device 110 successively utilizes a series of predetermined decoding schemes until the user computing device 110 successfully decodes each of the received audio tokens. In another example, the user computing device 110 successfully decodes Audio Token A but does not successfully decode Audio Token B. In yet another example, the user computing device 110 successfully decodes Audio Token B but does not successfully decode Audio Token A. In an example, audio tokens include data corresponding to one or more alphanumeric and/or symbolic characters. In another example, audio tokens include cryptographic or encoded data.

In block 260, the user computing device 110 selects the audio token received from the broadcasting computing device 130 and restricts audio inputs to correspond to the frequency channel over which the audio token was received. In an example, when the user computing device 110 receives multiple valid audio tokens, the user computing device 110 selects a particular audio SSID. For example, the application 113 on the user computing device 110 presents all available audio SSIDs to the user via a user interface 111 of the user computing device 110 for selection of a particular available audio SSID by the user 101. In an example, the user 101 of the user computing device 110 inputs a selection of a particular available audio SSID via the user interface 111 by actuating an interface object on the user interface 111. In another example, the user computing device 110 selects a particular available audio SSID from among multiple available audio SSIDs based on one or more criteria. In yet another example, the user computing device selects a particular available audio SSID from among multiple available audio SSIDs based on a correspondence of the selected particular available audio SSID with a particular audio SSID on a ranked list of preferred audio SSIDs stored on the user computing device 110 or accessible to the user computing device 110 via a network 120. In another example, the user computing device 110 transmits received available audio SSIDs to an account management computing system 140 over a network 120. The account management computing system 140 selects a particular audio SSID from the transmitted audio SSIDs and transmits the selected audio SSID to the user computing device 110 via the network 120.

In an example, the user computing device determines that an Audio Token A broadcast by broadcasting computing device 130 A comprises an invalid signature and an Audio Token B broadcast by broadcasting computing device 130 B comprises a valid signature. In response to determining that the Audio Token B comprises a valid signature, the user computing device 110 generates a response token, Response Token B that is a function of Audio Token B. In another example, the user computing device 110, after receiving Audio Token A and Audio Token B, determines, based on data received in Audio Token A and/or Audio Token B, that Audio Token A did not originate from a trusted source and that Audio Token B originated from a trusted source. In this other example, based on this determination, the user computing device 110 broadcasts Response Token B, which is a function of Audio Token B, in a frequency band that corresponds to the frequency band over which Audio Token B was broadcast by broadcasting computing device 130 B.

In yet another example, the user computing device 110 transmits a request, via a network 120, to the account management computing system 140. The request comprises decoded data from a received Audio Token A and a received Audio Token B. The user computing device 110 requests that the account management computing system 140 select a particular audio token from among Audio Token A and Audio Token B. In this example, the account management computing system 140 selects Audio Token B and transmits, via the network 120, a notice of the selection of Audio Token B to the user computing device 110. The user computing device 110 receives the notice of the selection of Audio Token B via the network 120.

In yet another example, the user 101 of the user computing device 110 selects an audio token. For example, the user computing device 110 receives and decodes Audio Token A and Audio Token B. In this example, Audio Token A comprises a broadcasting computing device 130 identifier comprising the word "apple" and Audio Token B comprises a broadcasting computing device 130 identifier comprising the word "banana." In an example, the user computing device 110 displays, via the user interface 111, a user interface 111 object that reads "apple," a user interface 111 object that reads "banana," and a request for the user 101 to select a user interface 111 object corresponding to a broadcasting computing device 130 identifier. For example, the request reads "please select a broadcasting device identifier to establish an audio communication channel." In this example, the user computing device 110 displays data describing each selectable broadcasting computing device 130 identifier including an indication as to whether the selectable broadcasting computing device 130 is trustworthy. For example, the user computing device 110 determines whether a broadcasting computing device 130 identifier is trustworthy based on a validity of a signature from a decoded audio token broadcast by the broadcasting computing device 130 with which an audio communication channel would be established. In this example, the user 101 selects an interface object on the user interface 111 of the user computing device 110 that reads "banana" and that corresponds with Audio Token B and broadcasting computing device 130 B. Based on the received input of the selection of the user interface 111 object corresponding to audio token B and broadcasting computing device 130 B, the user computing device 110 generates response token B.

In block 270, the user computing device 110 transmits a response audio token to the broadcasting computing device 130. Once the particular available audio SSID is selected, the user computing device 110 responds to the broadcasting computing device 130 from which the selected audio SSID originated using the same encoding scheme and frequency subchannel over which the user computing device 110 received the selected audio SSID. In these examples, the user computing device 110 and broadcasting computing device 130 are tuned within the audio subchannel and encoding scheme. Any further data exchanged between the user computing device 110 and the broadcasting computing device 130 is particularly formatted and therefore will be ignored by other user computing devices 110 or broadcasting computing devices 130 searching for audio SSIDs.

In an example, based on a determination that an Audio Token B is the only received audio token with a valid signature, the user computing device 110 broadcasts Response Token B in the audio frequency band that corresponds to the frequency band over which the Audio Token B was broadcast by a broadcasting computing device 130 B.

In another example, based on a received notice of a selection of Audio Token B by the account management system 140, the user computing device 110 broadcasts Response Token B, which is a function of Audio Token B, in the frequency band that corresponds to the frequency band over which Audio Token B was broadcast by a broadcasting computing device 130 B. In this example, broadcasting computing device 130 B receives Response Token B from the user computing device 110 and decodes the response token. In this example, upon receiving and decoding Response Token B, the broadcasting computing device 130 B and the user computing device 110 have established an audio communication channel.

In yet another example, based on the received input of the selection of the user interface 111 object corresponding to audio token B and a broadcasting computing device 130 B, the user computing device 110 broadcasts a Response Token B, which is a function of Audio Token B, in a frequency band that corresponds to the frequency band over which Audio Token B was broadcast by broadcasting computing device 130 B. In this example, broadcasting computing device 130 B receives Response Token B from the user computing device 110 and decodes the response token.

In block 280, the broadcasting computing device 130 receives the response audio token. For example, the broadcasting computing device 130 receives the response audio token over the network 120. In an example, a broadcasting computing device 130 B receives Response Token B from the user computing device 110 and decodes the response token.

In block 290, the broadcasting computing device 130 and the user computing device 110 communicate via an audio communication channel. In an example, upon receiving and decoding a Response Token B, the user computing device 110 and a broadcasting computing device 130 B (which transmitted the Audio Token B to the user computing device 110) have established an audio communication channel. For example, the user computing device 110 transmits data to and receive data from broadcasting computing device 130 B over the established audio communication channel. In this example, broadcasting computing device 130 B transmits data to and receives data from the user computing device 110 over the established audio communication channel.

In an example, after establishing an audio communication channel between a broadcasting computing device 130 and a user computing device 110 as described herein, the broadcasting computing device 130 transmits data to the user computing device 110 via the audio communication channel and the user computing device 110 receives the transmitted data via the audio communication channel. In an example, the transmitted data comprises advertising data. In an example, after establishing an audio communication channel between a broadcasting computing device 130 and a user computing device 110 as described herein, the account management computing system 140 processes a transaction. In an example, the account management computing system 140 receives transaction details from a broadcasting computing device 130 and payment information associated with a user 101 payment account from a user computing device 110. In another example, the account management computing system 140 receives transaction details from a broadcasting computing device 130 and extracts payment information associated with a user 101 payment account. In an example, the account management computing system 140 transmits a payment authorization request to an issuer system or other appropriate financial institution associated with the user 101 payment account information via the network 120. An example payment authorization request comprises merchant system payment account information, user 101 payment account information, and a total amount of the transaction. In an example, after the issuer system processes the payment authorization request, the account management system 140 receives an approval or denial of the payment authorization request from the issuer system over the network 120. In an example, the account management system 140 transmits a receipt to the broadcasting computing device 130 and/or the user computing device 110 comprising a summary of the payment transaction.

Other Examples

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A system to establish an audio communication channel between a broadcasting computing device and a user computing device, comprising:
   the user computing device comprising:
      a microphone component;
      a storage device; and
      a processor communicatively coupled to the storage device, wherein the processor executes application code instructions that are stored in the storage device to cause the user computing device to:
         receive an input indicating a request to receive data from a user of the user computing device;
         activate the microphone component to receive audio inputs via two or more audio frequency channels comprising at least a first audio frequency channel;
         receive a plurality of audio tokens from a plurality of computing devices, including a first audio token from the broadcasting computing device via the activated microphone component over the first audio frequency channel;
         determine whether the received first audio token comprises a valid audio token;
         in response to determining that the received first audio token is a valid audio token, restrict the range of received audio inputs to comprise only the first audio frequency channel;
         generate a first audio response token; and
         communicate the first audio response token to first computing device via the first audio frequency channel.

2. The system of claim 1, wherein the first audio token is broadcast at a first frequency band and the one or more other audio tokens are received at a frequency band different from the first frequency band.

3. The system of claim 1, wherein the microphone component is activated to receive audio inputs over an overall frequency band and the first audio token is broadcast at a subchannel of the overall frequency band.

4. The system of claim 1, wherein the first audio response token is generated as a function of the first audio token.

5. The system of claim 1, wherein the first audio response token is configured to cause the broadcasting computing device to broadcast data to the user computing device via the first audio frequency channel.

6. The system of claim 1,
   wherein:
   the first audio token is encoded using a first encoding scheme, wherein broadcasting the first audio token comprises broadcasting the encoded first audio token encoded using the first encoding scheme; and
   wherein the processor is further configured to execute application code instructions that are stored in the storage device to cause the user computing device to:
      decode the received first audio token using the first encoding scheme; and
      encode the generated first audio response token, wherein transmitting the first audio response token comprises transmitting the encoded first audio response token encoded according to the first encoding scheme.

7. The system of claim 6, wherein decoding the received first audio token comprises cycling through two or more audio decoding schemes comprising at least the first encoding scheme until the first encoding scheme is successfully used to decode the first received audio token.

8. The system of claim 1, wherein determining that the received first audio token comprises a valid audio token comprises:
   extracting an identifier from the received first audio token;
   presenting the identifier via a user interface; and
   receiving an input via the user interface indicating approval of the identifier.

9. The system of claim 1, wherein determining that the received first audio token comprises a valid audio token comprises:
   extracting an identifier from the received first audio token;
   comparing the identifier to each of one more valid identifiers in a list of valid identifiers; and
   determining that the identifier matches a particular valid identifier in the list of valid identifiers.

10. The system of claim 1, wherein determining that the received first audio token comprises a valid audio token comprises:

transmitting the received first audio token and the one or more other received audio tokens to one or more computing devices; and receiving, from the one or more computing devices, a selection of the first audio token.

11. A computer-implemented method to establish an audio communication channel between a broadcasting computing device and a user computing device, comprising:

receiving, by the user computing device, an input indicating a request to receive data from a user of the user computing device, wherein the broadcasting computing device broadcasts a first audio token comprising a broadcasting computing device identifier over a first audio frequency channel;

activating, by the user computing device, a microphone component to receive audio inputs via two or more audio frequency channels comprising at least the first audio frequency channel;

receiving, by the user computing device, the first audio token from the first computing device via the activated microphone component over the first audio frequency channel;

receiving, by the user computing device, one or more other audio tokens via the activated microphone component over one or more other audio frequency channels not comprising the first audio frequency channel;

determining, by the user computing device, whether the received first audio token comprises a valid audio token;

in response to determining that the received first audio token is a valid audio token, restricting, by the user computing device, a range of received audio inputs to comprise only the first audio frequency channel;

generating, by the user computing device, a first audio response token; and communicating, by the user computing device, the first audio response token to the broadcasting computing device via the first audio frequency channel, wherein the broadcasting computing device receives the first audio response token via the first audio frequency channel.

12. The method of claim 11, wherein broadcasting the first audio token over the first audio frequency channel comprises broadcasting the first audio token at a first frequency band and the one or more other audio tokens are received at a frequency band different from the first frequency band.

13. The method of claim 11, wherein the microphone component is activated to receive audio inputs over an overall frequency band and the first audio token is broadcast at a subchannel of the overall frequency band.

14. The method of claim 11, wherein the first audio response token is generated as a function of the first audio token.

15. The method of claim 11, further comprising, in response to receiving the first audio response token from the user computing device, broadcasting, by the broadcasting computing device, data to the user computing device via the first audio frequency channel.

16. A non-transitory computer-readable medium storing instruction that, when executed by a user computing device, cause the user computing device to perform operations, the operations comprising:

receiving an input indicating a request to receive data from a user of the user computing device, wherein a broadcasting computing device broadcasts a first audio token comprising the broadcasting computing device identifier over a first audio frequency channel;

activating a microphone component to receive audio inputs via two or more audio frequency channels comprising at least the first audio frequency channel;

receiving the first audio token from the broadcasting computing device via the activated microphone component over the first audio frequency channel;

receiving one or more other audio tokens via the activated microphone component over one or more other audio frequency channels not comprising the first audio frequency channel;

determining whether the received first audio token comprises a valid audio token;

restricting, in response to determining that the received first audio token is a valid audio token, a range of received audio inputs to comprise only the first audio frequency channel;

generating a first audio response token; and communicating the first audio response token to first computing device via the first audio frequency channel, wherein the broadcasting computing device receives the first audio response token via the first audio frequency channel.

17. The non-transitory computer-readable medium of claim 16, wherein the first audio token is broadcasted over the first audio frequency channel at a first frequency band and the one or more other audio tokens are received at a frequency band different from the first frequency band.

18. The non-transitory computer-readable medium of claim 16, wherein the microphone component is activated to receive audio inputs over an overall frequency band and the first audio token is broadcast at a subchannel of the overall frequency band.

19. The non-transitory computer-readable medium of claim 16, wherein the first audio response token is generated as a function of the first audio token.

20. The non-transitory computer-readable medium of claim 16, wherein the received first audio token is decoded by cycling through two or more audio decoding schemes comprising at least the first encoding scheme until the first encoding scheme is successfully used to decode the first received audio token.

* * * * *